(12) United States Patent
Aubrey et al.

(10) Patent No.: US 9,925,853 B2
(45) Date of Patent: Mar. 27, 2018

(54) LOAD BEARING TONNEAU STRUCTURE

(71) Applicants: Jennifer Aubrey, Bountiful, UT (US);
David Rosal, West Bountiful, UT (US);
Russell Kingston, Bountiful, UT (US);
John Hall, Bountiful, UT (US); Patrick Sessions, Eagle Mountain, UT (US);
Kent Kingston, Provo, UT (US); Scott M. Packer, Highland, UT (US)

(72) Inventors: Jennifer Aubrey, Bountiful, UT (US);
David Rosal, West Bountiful, UT (US);
Russell Kingston, Bountiful, UT (US);
John Hall, Bountiful, UT (US); Patrick Sessions, Eagle Mountain, UT (US);
Kent Kingston, Provo, UT (US); Scott M. Packer, Highland, UT (US)

(*) Notice: Subject to any disclaimer, the term of this patent is extended or adjusted under 35 U.S.C. 154(b) by 0 days.

(21) Appl. No.: 15/085,368

(22) Filed: Mar. 30, 2016

(65) Prior Publication Data
US 2016/0288691 A1    Oct. 6, 2016

Related U.S. Application Data

(60) Provisional application No. 62/139,957, filed on Mar. 30, 2015, provisional application No. 62/250,303, filed on Nov. 3, 2015.

(51) Int. Cl.
*B60J 7/14* (2006.01)
*B60P 7/02* (2006.01)
(Continued)

(52) U.S. Cl.
CPC ............ *B60J 7/141* (2013.01); *B60P 7/02* (2013.01); *B60P 7/06* (2013.01); *B60R 5/045* (2013.01)

(58) Field of Classification Search
CPC ........ B60J 7/141; B60J 7/1607; B60J 7/1621; B60P 7/02; B60P 7/06
(Continued)

(56) References Cited

U.S. PATENT DOCUMENTS

| 3,420,570 A | 1/1969 | Kunz |
| 3,765,717 A | 10/1973 | Garvert |

(Continued)

FOREIGN PATENT DOCUMENTS

| CA | 2412230 | 2/2002 |
| WO | WO0214096 | 2/2002 |

OTHER PUBLICATIONS https://diamondbackcovers.com/ DIAMONDBACK Covers web site p. 1-4.

*Primary Examiner* — Jason S Daniels
(74) *Attorney, Agent, or Firm* — Morriss O'Bryant Compagni Cannon, PLLC

(57) ABSTRACT

A system and method for providing a folding load bearing hard tonneau cover which includes a hinge/connection element using a novel friction stir welding method to weatherproof the bed contents, wherein each folding section is constructed using friction stir welds for strength, stiffness and visual appeal, wherein the system does not rely on attached bed rails to support and lock the cover because loads are reacted on the bed caps, wherein a spring loaded latching system has the strength to react the moments generated by heavy loads on top of the cover, wherein installation does not require modification to the bed, and wherein the tonneau cover may carry heavy loads on top that are easy to secure, while still allowing a cover that folds open.

12 Claims, 30 Drawing Sheets

(51) Int. Cl.
*B60P 7/06* (2006.01)
*B60R 5/04* (2006.01)

(58) Field of Classification Search
USPC ............ 296/100.01, 100.02, 100.06, 100.09
See application file for complete search history.

(56) References Cited

U.S. PATENT DOCUMENTS

| | | | |
|---|---|---|---|
| 3,936,077 A | 2/1976 | Bliek | |
| 4,273,377 A | 6/1981 | Alexander | |
| 4,285,539 A | 8/1981 | Cole | |
| 4,313,636 A | 2/1982 | Deeds | |
| 4,377,309 A | 3/1983 | Mengshoel | |
| 4,394,100 A | 7/1983 | Sperlich | |
| 4,418,954 A | 12/1983 | Buckley | |
| 4,479,677 A | 10/1984 | Gulette et al. | |
| 4,550,945 A * | 11/1985 | Englehardt | B60J 7/041 160/213 |
| 4,563,034 A | 1/1986 | Lamb | |
| 4,573,730 A | 3/1986 | Gondert et al. | |
| 4,639,033 A | 1/1987 | Wheatley et al. | |
| 4,730,866 A | 3/1988 | Nett | |
| 4,739,528 A | 4/1988 | Allen | |
| 4,762,360 A | 8/1988 | Huber | |
| 4,783,112 A | 11/1988 | Lovaas | |
| 4,792,178 A | 12/1988 | Kokx | |
| 4,792,179 A | 12/1988 | Stevens | |
| 4,824,162 A | 4/1989 | Geisler et al. | |
| 4,838,602 A | 6/1989 | Nett | |
| 4,848,824 A | 7/1989 | Smith et al. | |
| 4,861,092 A | 8/1989 | Bogard | |
| 4,941,705 A | 7/1990 | Wurtz | |
| 5,058,652 A | 10/1991 | Wheatley et al. | |
| 5,067,768 A | 11/1991 | Fischbach | |
| 5,087,913 A | 2/1992 | Eastman | |
| 5,098,148 A | 3/1992 | Hoban | |
| 5,121,960 A | 6/1992 | Wheatley | |
| 5,301,995 A | 4/1994 | Isler | |
| 5,310,238 A | 5/1994 | Wheatley | |
| 5,316,357 A | 5/1994 | Schroeder | |
| 5,322,336 A | 6/1994 | Isler | |
| 5,365,994 A | 11/1994 | Wheatley et al. | |
| 5,427,428 A | 6/1995 | Ericson et al. | |
| 5,460,423 A | 10/1995 | Kersting et al. | |
| 5,522,635 A | 6/1996 | Downey | |
| 5,595,417 A | 1/1997 | Thoman et al. | |
| 5,632,522 A | 5/1997 | Gaitan et al. | |
| 5,636,893 A | 6/1997 | Wheatley et al. | |
| 5,688,017 A | 11/1997 | Bennett | |
| 5,795,011 A | 8/1998 | Flentge | |
| 5,851,047 A | 12/1998 | Adams et al. | |
| 5,857,729 A | 1/1999 | Bogard | |
| 5,887,934 A | 3/1999 | Smith | |
| 5,975,618 A | 12/1999 | Rippberger | |
| 6,082,806 A | 7/2000 | Bogard | |
| 6,095,588 A | 8/2000 | Rodosta | |
| 6,126,225 A | 10/2000 | Griffin | |
| 6,126,226 A | 10/2000 | Wheatley | |
| 6,170,900 B1 | 1/2001 | Kooiker | |
| 6,183,035 B1 | 2/2001 | Rusu et al. | |
| 6,227,602 B1 * | 5/2001 | Bogard | B60J 7/141 296/100.06 |
| 6,527,326 B2 | 3/2003 | Henderson | |
| 6,565,141 B1 | 5/2003 | Steffens et al. | |
| 6,702,359 B2 | 3/2004 | Armstrong et al. | |
| 6,883,855 B2 | 4/2005 | Chverchko et al. | |
| 7,246,839 B1 | 7/2007 | Nyberg | |
| 7,484,788 B2 | 2/2009 | Calder et al. | |
| D620,877 S | 8/2010 | Rusher et al. | |
| 8,262,148 B2 | 9/2012 | Rusher et al. | |
| 8,262,748 B2 | 9/2012 | Moncrieff et al. | |
| 8,348,328 B2 | 1/2013 | Walser et al. | |
| 9,381,794 B2 * | 7/2016 | Gomes | B60P 7/06 |
| 9,487,248 B1 * | 11/2016 | Buckhalt | B60R 7/02 |
| 2002/0145299 A1* | 10/2002 | Henderson | B60J 7/141 296/61 |
| 2004/0134162 A1* | 7/2004 | Douglas | E02D 27/02 52/741.1 |
| 2010/0140973 A1 | 6/2010 | Duncan | |
| 2011/0062744 A1 | 3/2011 | Schrader et al. | |
| 2013/0093206 A1* | 4/2013 | Rusher | B60R 7/02 296/100.14 |

* cited by examiner

LOAD BEARING TONNEAU STRUCTURE

BACKGROUND

Field of the Invention:

This invention relates generally to tonneau covers. Specifically, the present invention is directed to obtaining an improved load bearing tonneau cover through the use of friction stir welding.

Description of Related Art:

A tonneau cover may describe a hard or soft cover used to protect unoccupied passenger seats in a convertible or roadster, or the cargo bed in a pickup truck. Hard tonneau covers may open by a hinging or folding mechanism while soft covers may open by rolling up.

A tonneau cover may be used to conceal cargo or protect cargo from the elements. When the tonneau cover is used, it may keep cargo out of the sun and provides extra security by keeping items out of sight.

Tonneau covers have been well documented in publications since their inception in the early 1900s as a means to cover or conceal cargo in a vehicle. Even though vehicles have evolved in design and function over the years, the design of marketable tonneau covers may have only evolved in terms of aesthetics rather than increased practical functionality.

The largest market for tonneau covers may be the pickup truck. It has been estimated that 98% of the tonneau covers made for this market serve the singular function of covering the cargo bed to compliment the look of the vehicle.

One style of tonneau cover is the soft cover. The soft tonneau cover may generally be made from fabrics or fabric composites that resist water and UV light damage. This may be the most common cover because of its low cost. This style may be made to retract or roll up or back into position. The soft tonneau cover may occupy the least amount of space and there are a variety of attachment and fastening methods that are employed to attach it to a pickup truck.

A second style of tonneau cover is the hard cover. The hard cover is typically made from fiberglass, hard plastic, rubber, aluminum or some combination of these or other materials. The tonneau covers made from fiberglass may be described as a single shell type cover that opens by a hinge at the cab portion of the bed. Because they are quite heavy they may include pneumatically assisted cylinders for opening and closing. The hard tonneau covers are often made to order so that their color matches the color of the truck.

A variation of the hard tonneau cover is one that utilizes a series of foldable sections to cover the cargo portion of the bed. These sections can fold together from the rear to the front of the truck and stack near the cab to make use of the cargo portion of the truck bed. A variation of this design is to have a foldable section that opens from the side of the truck bed. The hard tonneau covers may either have locks located in the foldable panels or open from the inside of the bed. Typically, the covers that open from the inside of the bed rely on the factory locking tailgate to secure the bed contents. The hard tonneau cover is the next cost increment to not only cover the contents of the truck bed but to secure them as well with a lock system so that valuable items can be safely kept in the truck bed.

Both hard and soft tonneau covers may have a profile as low as possible with the top edge of the truck bed sides and tailgate for improved aesthetics. As a result, additional hardware may be needed to mount the tonneau cover to the inside walls of the truck bed.

One style of hard tonneau cover, fabricated from aluminum, has been developed to carry a load on the top while leaving the bed under the cover to carry additional items. This cover opens in a gull-wing manner with hinges secured across the middle of the truck bed allowing aluminum sections to open in the front behind the truck cab and at the tailgate. The utility is further increased by using boat style cleats for cargo tie downs. This style of tonneau cover is locked from the top of the cover and may have a protruding handle lock.

It is important to note that tonneau covers are aftermarket purchases that may need to be aesthetically pleasing to attract customers. Also, the owner may resist modifying a vehicle by making permanent changes such as drilling into the body or bed for attachment points.

There are some problems with existing tonneau covers. The soft tonneau covers may be limited to a covering function and cannot effectively be used for supporting objects. These tonneau covers may only protect the contents of the truck bed from weather. They may require multiple fasteners to be installed on the truck bed. It is a problem for many vehicle owners to drill holes in their vehicle for mounting these fasteners. In the event that it is desired to remove the cover altogether, the vehicle is left with exposed fasteners or if the fasteners are removed, permanent holes in the vehicle.

The single section hard tonneau cover, such as those made of fiberglass, may also require hardware mounted to the bed itself. This hardware may include hinges near the cab, gas struts on the sides and some sort of locking mechanism on the tailgate. In most cases, they are special ordered to be painted the color of the truck and a professional installer may need to be used for the installation.

There are several problems with this hard tonneau cover system. For example, the single section may only be opened as far as the gas struts allow. This means that nothing higher than the bed rails (if the cover is closed) could be put in the cargo section of the bed unless the hard tonneau cover itself is removed. If the hard tonneau cover is removed, it typically requires 2 people to undo hardware and lift the cover from the truck. This additional cost along with the yearly change in bed sizes for new truck models may make this a difficult and costly manufacturing/supply process.

Another problem with this hard tonneau cover design is the use of screws to attach hardware to the truck bed. A truck may experience extreme vibration during work and recreational use, especially if it is driven off road. Over a short amount of time, the thin sheet metal surrounding the screws may have a tendency to wear, deform and enlarge leaving a heavy tonneau cover improperly secured to the vehicle.

Hard tonneau covers with folding sections may add the element of utility by folding back and allowing objects taller than the sides of the bed to be transported in the bed without removing the hard tonneau cover. Unfortunately, most of the designs for hard tonneau covers have a significant number of parts required for construction to achieve this design objective. This construction may include rails that must be attached to the inside of the bed rails and each foldable section must fit uniformly and rest on these rails.

If the inside measurement across the width of the truck bed at the tailgate is 2 to 4 inches less than the inside measurement taken across the bed at the cab (both measurements taken at rail height) as in many trucks, each folding section may need to be trapezoidal in shape for proper fit up with the bed rails. This taper varies with make, model and year, and is a tremendous difficulty and expense for manufacturers to deal with for the multitude of trapezoidal shaped folding sections.

The problem may often be managed by offshore sourcing of materials to reduce cost and followed by domestic assembly of the components. Offshore sourcing is becoming more problematic because of long lead times, higher shipping costs, and higher component costs as world manufacturing costs merge closer together. Also, the uncertainty of foreign suppliers and their respective governments, means that domestic manufacturers must bear the risk of higher inventories, and consequently, higher costs. Further, costs may be incurred as a result of obsolete products which cannot be dumped in the market place without affecting existing price levels.

For the additional cost, these folding hard tonneau covers have only added a single dimension of utility by increasing cargo bed utilization. It is unfortunate that much of the cost and effort that goes into the design and fabrication of a folding hard tonneau cover may not provide additional utility. For example, the hard tonneau cover may not be able to carry loads or objects on top without being damaged. Many hard tonneau cover designs do not allow for any load whatsoever on top and therefore do not have attachment points to carry a load. In addition, the inherent design of the hard tonneau cover may not allow any load on the top surface because of small rails that are designed only to bear the weight of the tonneau cover and not the additional cargo load.

A pickup truck bed utility might be increased if additional items or cargo could be placed on top of the hard tonneau cover and secured while maintaining aesthetics of the cover.

One prior art design tried to provide this functionality by using aluminum tread plate sheet as a top layer with square tubing welded to the underside. This design has several design problems. First, the design prevents tall bed cargo utility by allowing only a small portion of the bed to be accessible to carrying tall cargo. Second, this tonneau cover is secured in the middle section of the truck bed by connecting the truck rails directly over the wheel wells. Hinges connect a front cab facing section and rear tailgate facing section aluminum structure which partially open with gas strut assistance. This design prevents the use for cargo taller than the bed rail to be placed in the truck bed. The struts can be disconnected on one side to somewhat increase the payload capacity, however securing the payload with tie downs is severely limited. Third, the tie down method employed utilizes a series of cleats that extend above the surface around the periphery of the cover. These cleats are prone to breakage during loading and unloading and are aesthetically undesirable. Fourth, the aluminum is conventional welded throughout the entire construction of the hard tonneau cover. These welds may cause distortion, may cause solidification defects, may be a starting point for corrosion, and may be a starting locations for crack initiation—especially when the tonneau cover is under load. Fifth, conventional hinges are mechanically attached to the folding sections and may be prone to loosening. The locations may also be locations for water entry and don't protect cargo under the cover from the weather. Sixth, there are latches on the top surface that lock the cover to the truck. These latches also protrude above the surface of the hard tonneau cover and prevent loads from being slid on and off of the surface of the cover. Seventh, because this load carrying design does not allow access to much of the bed, it may need to be removed to allow the use of hitching a goose neck trailer (used for cargo, livestock hauling, etc.) and 5th wheel trailers used for recreation.

Another matter that must be discussed is a latching mechanism that needs to be used to prevent the embodiments of the invention from moving during braking or acceleration of a vehicle. It seems that there are an infinite number of latch styles and types for many applications. They range from typical door latches used in homes to specialty latches found in the automotive and aerospace applications. The majority of these applications utilize latches that restrict one degree of freedom of each side of a hinged device. Simply stated, they are used to keep two components on a hinge from opening. The next most common hinge restricts 2 degrees of freedom and is used to maintain the closure of 2 components but resists lateral sliding along the hinge axis. The most common of these latches is a buckle latch. Buckle latches are common to travel trunks that need to resist the top and bottom sections from sliding apart at the closure plane. These latches are used when the hinge is not rigid enough to prevent an extra degree of freedom.

It is interesting to note that assembly engineering design convention typically utilizes latches that resist one degree of freedom for the use of the assembly. In other words, hinges are designed to resist load conditions except for the movement of opening and closing said hinged components. This latch style resists one degree of freedom, the motion to open the hinged components. There are many design opportunities where the hinge is compliant and cannot resist all of the degrees of freedom of the hinged assembly. One example of this case is the load bearing foldable tonneau cover. Compliant hinges may be used to join at least 2 load bearing sections of this foldable tonneau cover. Since the hinges are compliant, the forces of the load secured to the top of the cover and the tonneau cover itself must be reacted against the truck bed in some fashion. This latch system must react 3 degrees of freedom—1. The force to lift the cover upwards, 2. The force to prevent the cover and load from sliding forwards when the truck brakes are suddenly applied, and 3. The force applied when the truck quickly accelerates. Each section of the tonneau cover that has an attached load must be able to react the forces to the bed of the truck. In addition, the latch system must be low profile and still allow each cover to fold on itself.

There are many other examples of assemblies and compliantly hinged components that could benefit from a latch solution that would eliminate at least 2 degrees of freedom.

It is to be understood that the following description is only exemplary of the principles of the present invention, and should not be viewed as narrowing the claims which follow.

BRIEF SUMMARY

The present invention is a system and method for providing a folding load bearing hard tonneau cover which includes a hinge/connection element using a novel friction stir welding method to weatherproof the bed contents, wherein each folding section is constructed using friction stir welds for strength, stiffness and visual appeal, wherein attachment D rings are capable of sustaining high tie down loads, do not rattle during driving and are kept below the working surface of the cover when not in use, wherein threaded attachment points on top and underside of the tonneau cover allows for modular systems to attach to the tonneau cover, wherein the system does not rely on attached bed rails to support and lock the tonneau cover because loads are reacted on the bed caps, wherein a spring loaded latching system has the strength to react the moments generated by heavy loads on top of the tonneau cover, wherein installation does not require modification to the bed but instead uses a 2 bolt attachment system, and wherein the tonneau cover may carry heavy loads on top that are easy to secure, while still allowing a cover that folds open so a fifth wheel, goose neck trailer, or high profile loads can be carried.

These and other embodiments of the present invention will become apparent to those skilled in the art from a consideration of the following detailed description taken in combination with the accompanying drawings.

DETAILED DESCRIPTION

Reference will now be made to the drawings in which the various embodiments of the present invention will be given numerical designations and in which the embodiments will be discussed so as to enable one skilled in the art to make and use the invention. It is to be understood that the following description illustrates embodiments of the present invention, and should not be viewed as narrowing the claims which follow.

Figure 1:
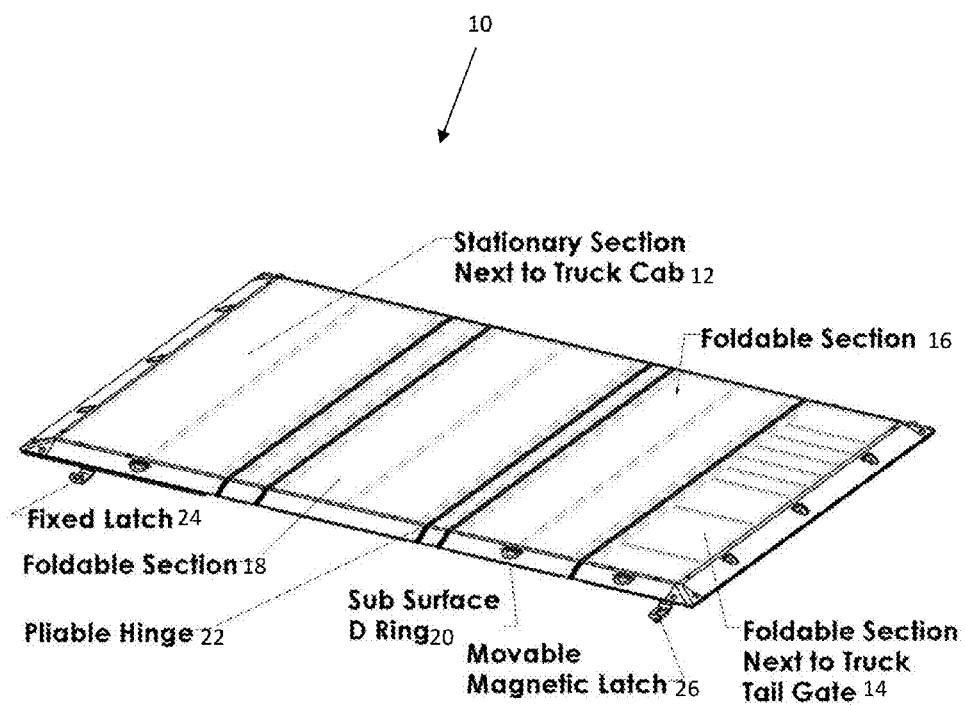
FIG. 1 is a perspective view of the overall design and layout of the tonneau cover of the first embodiment.

A first embodiment of the present invention is shown in FIG. 1. This first embodiment may incorporate elements required to support heavy loads even up to the pickup truck load carrying capacity, fold to the cab of the truck to allow for tall objects in the bed of the truck, fold to the cab to allow the attachment of goose neck and 5th wheel hitches without removing the tonneau structure from the truck, have no protruding handles, hinges, cleats or tie downs to be aesthetically pleasing to the eye, have below surface attachment locations in thick cross section elements on the exterior and interior for attaching accessories to meet specialty customer needs according to their preference, have no bolts or traditional fasteners for its construction, have no conventional welds (Tig, Mig, or other conventional welding methods), not require modification to the vehicle for attachment with holes or screws, be easily removable, have a unique hinge design that is durable and weather resistant, allow for internal storage of frequently used items which include but are not limited to a tow strap, jumper cables, tie down straps, gloves, flashlight, etc., have removable sections that can adjust the length of the tonneau structure to accommodate tool boxes, external fuel tanks, etc., and have a unique magnetic latching system that allows for quick and easy opening, closing and locking the tonneau structure.

A diagram of this tonneau cover of the first embodiment is shown in FIG. 1. This tonneau cover 10 is a hard structure and may rest on top of the bed rails of a pickup truck (not shown). The load bearing capability of the tonneau cover may come from the unique method of combining structural components on the underside of the load bearing tonneau cover 10 surface. Features and components may include a stationary section next to the truck cab 12, a foldable section next to the truck tailgate 14, a foldable section 16, another foldable section 18, a plurality of subsurface D rings 20, pliable hinges 22 between each section 12, 14, 16, 18 of the tonneau cover 10, a fixed latch 24 for securing the nonfolding section 12 to the truck bed, and a movable magnetic latch 26 for securing one or more foldable sections 14, 16, 18 to the truck bed.

Figure 2:
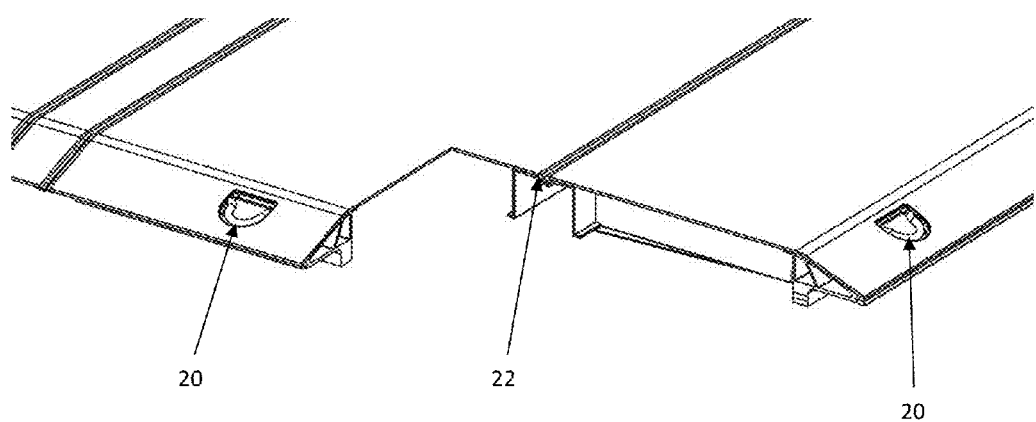
FIG. 2 is a perspective view of joint locations that may be joined using solid state joining techniques of friction stir welding.

FIG. 2 shows a cross sectional view of the tonneau cover 10 to illustrate the joining process. This figure illustrates two subsurface D rings 20 and a cross section of a pliable hinge 22.

Figure 3:
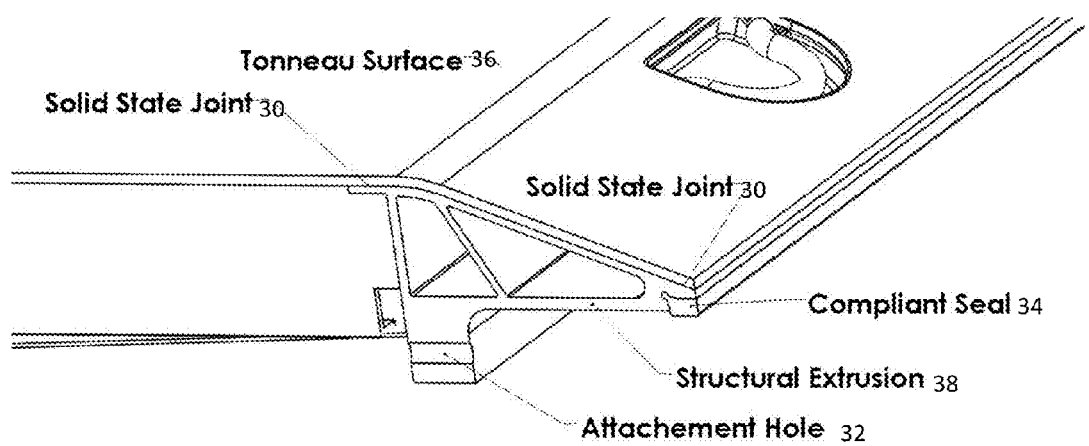
FIG. 3 is a perspective view of edge joint configuration showing locations of solid state joints of the first embodiment.

FIG. 3 also shows a close-up cross sectional view of an edge of the tonneau cover 10 that illustrates the locations of solid state joints 30. This figure also illustrates a cross section of an attachment hole through the tonneau cover 10, a compliant seal 34 which is pressed against the truck bed, the surface 36 of the tonneau cover, and a portion of the structural extrusion 38 of the edge of the tonneau cover.

In order for a tonneau cover 10 to be durable as it serves as a utility surface, the first embodiment may eliminate mechanical fasteners such as screws, rivets, crimped interlocks, and other common devises that often form the integral structure of prior art tonneau covers. These fasteners may be acceptable for large or thick cross sections; however, they tend to be failure points for thin cross sections that exist in the tonneau cover 10 of the first embodiment.

Other joining methods such as conventional weld methods which require the melting and subsequent freezing of materials to form a joint are also eliminated with this construction method of the first embodiment. A solid state joining method may include but not be limited to a combination of friction stir joining, friction stir spot joining, friction stir processing, linear friction joining, etc. and are referred to hereinafter collectively as friction stir welding. The friction stir welding may be used at all appropriate joint locations such as those shown in FIGS. 1, 2 and 3.

Using friction stir welding to create the solid state joints 30 of the tonneau cover 10 may be advantageous because the tonneau cover may be constructed as a continuous skeletal structure without the disadvantages of a structure that is welded using conventional welding techniques. Using friction stir welding may eliminate the problems of conventional joints that become stress raisers that lead to component failure. Friction stir welding of joints may be an essential element of the first embodiment in order to resist the extreme environment of high loads, vibration and impact which is considered normal use for pickup trucks and off road vehicles.

Figure 4:
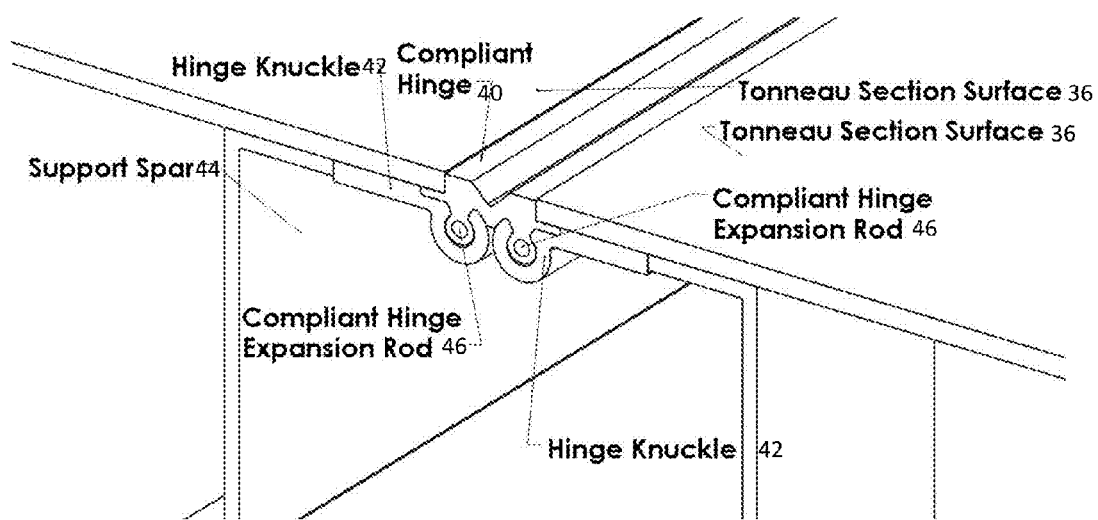
FIG. 4 is a perspective view of a method of joining sections together using a compliant hinge and expansion rod of the first embodiment.

FIG. 4 shows a second aspect of the first embodiment which is a means used to connect folding sections 14, 16, 18 together, an example of which is illustrated. The first embodiment may use a compliant hinge 40, such as rubber or a rubber-like material, which may be inserted into a hinge knuckle 42 on each adjoining section 12, 14, 16, 18 of the tonneau cover 10. The hinge knuckle 42 may be joined in a solid state method to not only the surface 36 of the tonneau cover 10 but to a support spar 44. The compliant hinge 40 may be inserted into each hinge knuckle 42 followed by an expansion rod 46 that is inserted through the center of the compliant hinge 40 shown in FIG. 4. This forms a high strength sealed joint that may be waterproof. The expansion rod 46 may be easily removed to replace a section 12, 14, 16, 18 of the tonneau cover 10 or to change a configuration of tonneau sections.

Figure 5:
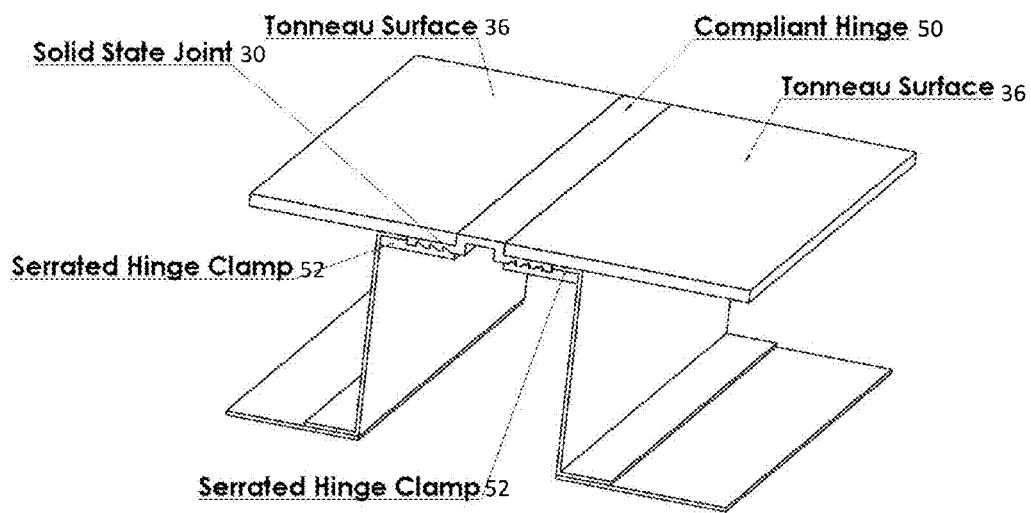
FIG. 5 is a perspective view of method of joining sections together using a compliant hinge and expansion rod of a second embodiment.

FIG. 5 shows an alternate method for joining tonneau sections 12, 14, 16, 18 together with a serrated compliant hinge 50 in a second embodiment of the invention. FIG. 5 may use a serrated configuration of the serrated compliant hinge 50. This configuration may include serrated hinge clamps 52 that grip the serrated compliant hinge 50 as shown.

Figure 6:
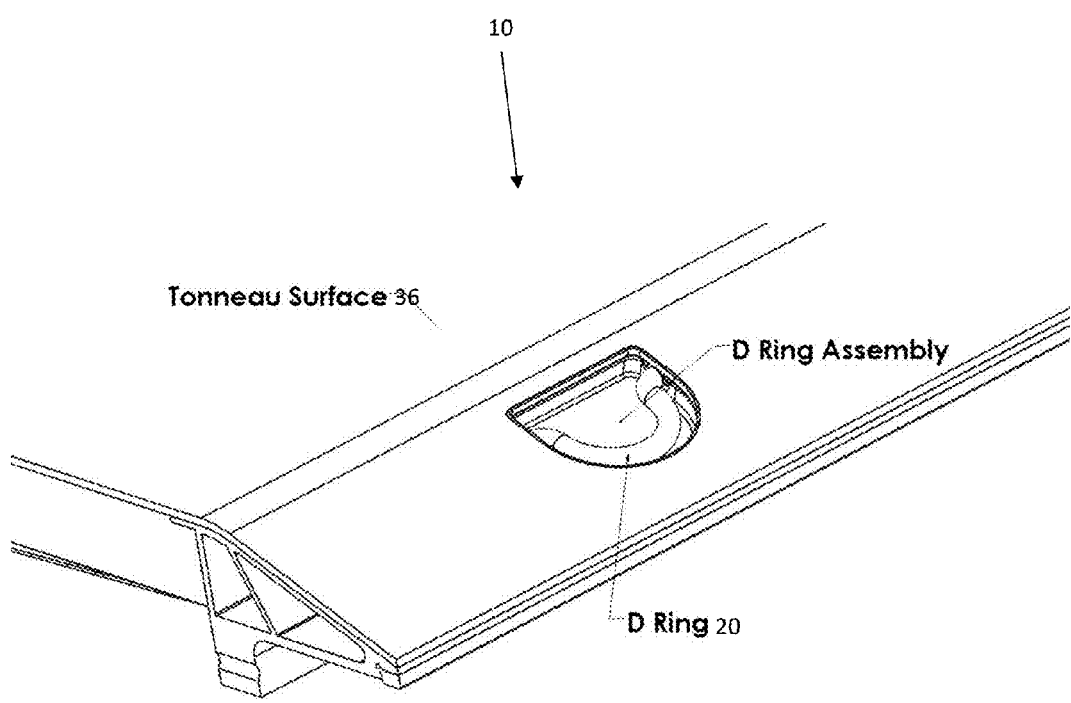
FIG. 6 is a perspective view of a D ring assembly for load attachment of the first embodiment.

FIG. 6 illustrates another aspect of the first embodiment of the invention which is a means to attach loads to the surface 36 of the tonneau cover 10. Specifically, the first embodiment uses a low profile D ring 20 and its assembly that is both aesthetically pleasing and functional.

Figure 7:
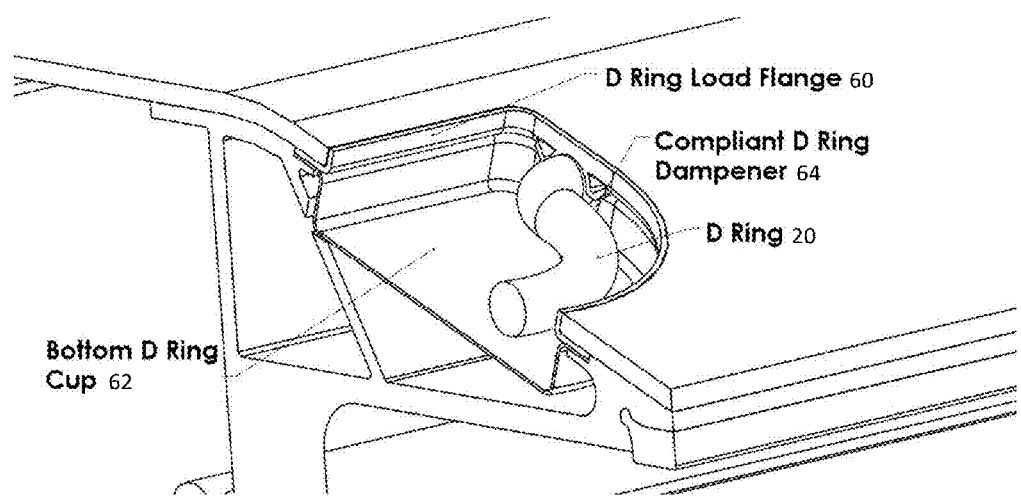
FIG. 7 is a close-up perspective view of the D ring of FIG. 6 of the first embodiment.

FIG. 7 is a close up and cut-away illustration of the D ring 20 and its assembly of FIG. 6. Rather than using the typical screw or bolt to fasten and carry the load of a D ring assembly, the first embodiment may use a D ring load flange 60 which may be inserted into a "D" shaped profile from the underside of the surface 36 of the tonneau cover 10 prior to solid state joining the surface to a tonneau edge structure. This D ring load flange 60 may be a high strength material having a large surface area and may be able to resist high loads. A bottom D ring cup 62 may be inserted underneath the D ring load flange 60 not only for aesthetics, but may also keep weather from entering the internal portions of the edge support. The D ring assembly may also include a compliant D ring dampener 64.

Figure 8:
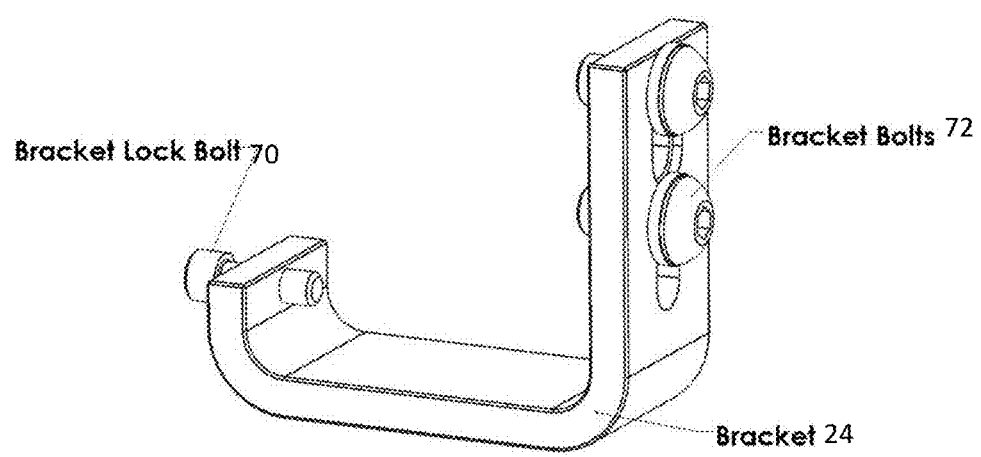
FIG. 8 is a perspective view of a fixed J bracket for securing the tonneau cover to truck bed rails of the first embodiment.
Figure 9:
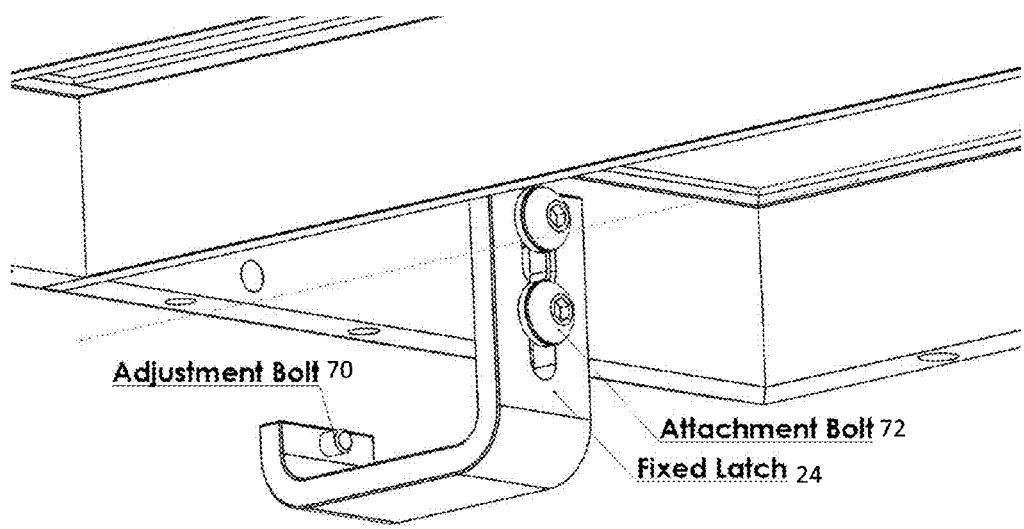
FIG. 9 is a perspective view of the fixed J bracket of the first embodiment for securing the tonneau cover to the thick section of truck bed rails.

Another important aspect of the first embodiment of the invention may be the ability to easily attach the tonneau cover 10 to the pickup truck bed rail without modifying the bed with holes and screws while capable of reacting loads attached to the surface 36 of the tonneau cover 10. The tonneau cover 10 should easily unlock, open, unfold, fold back and lock. FIGS. 8 and 9 illustrate a J clamp 24 that may be attached to any thick section attachment location under the tonneau cover 10 to secure the tonneau cover under the edge rails of the truck. This J clamp 24 may be used to secure the tonneau cover 10 section 12 near the cab to a truck bed rail.

FIG. 8 is a perspective view of a fixed J bracket 24 that may be used to secure the tonneau cover 10 to the truck bed rails, and may include a bracket lock bolt 70 and bracket bolts 72.

FIG. 9 is a perspective view showing the fixed J latch 24 attached to the thick section on the underside of the tonneau cover 10.

The first embodiment of the invention may utilize a movable magnetic clamp 26 design that may also be attached to various thick section locations under the tonneau cover 10 for quick securing and un-securing of the section 14, 16, 18 of the tonneau cover that is being opened or closed.

Figure 10:
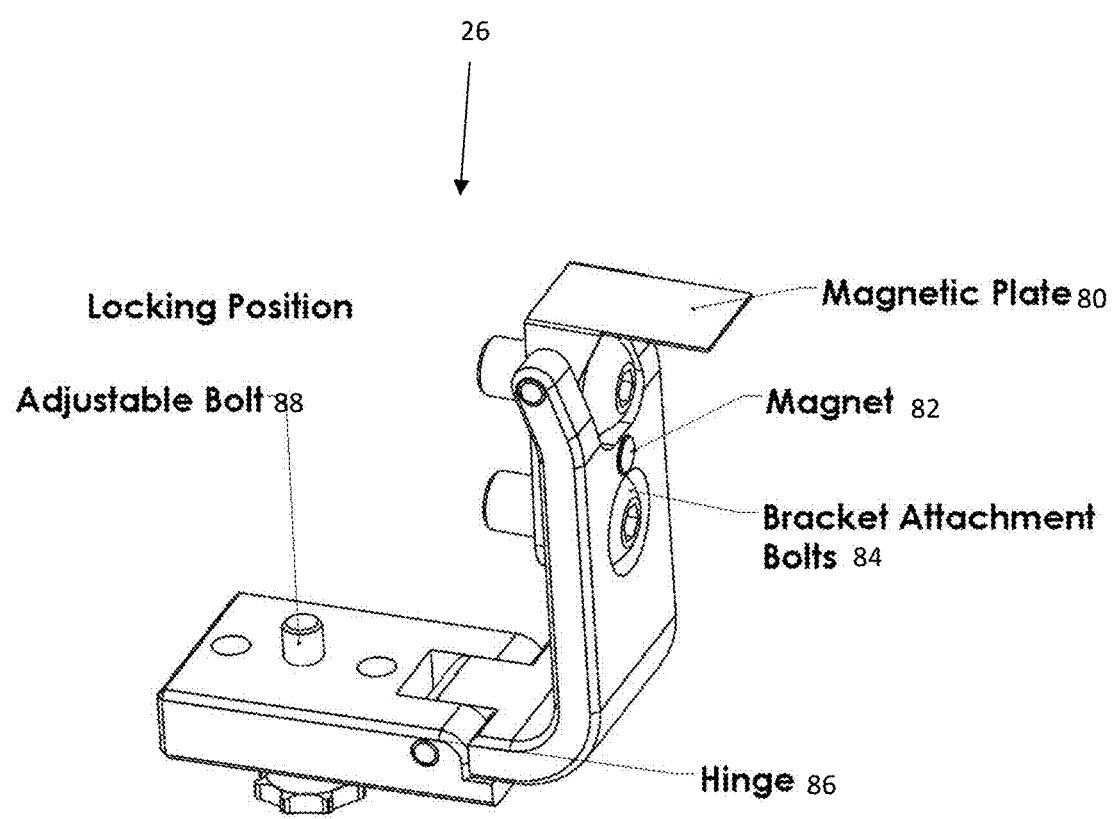
FIG. 10 is a perspective view of a moveable locking bracket of the first embodiment shown in a locking position.

FIG. 10 is a perspective view of a moveable magnetic locking bracket 26 shown in a locking position, and may include a magnetic plate 80, a magnet 82, bracket attachment bolts 84, a first hinge 86 and an adjustable bolt 88.

Figure 11:
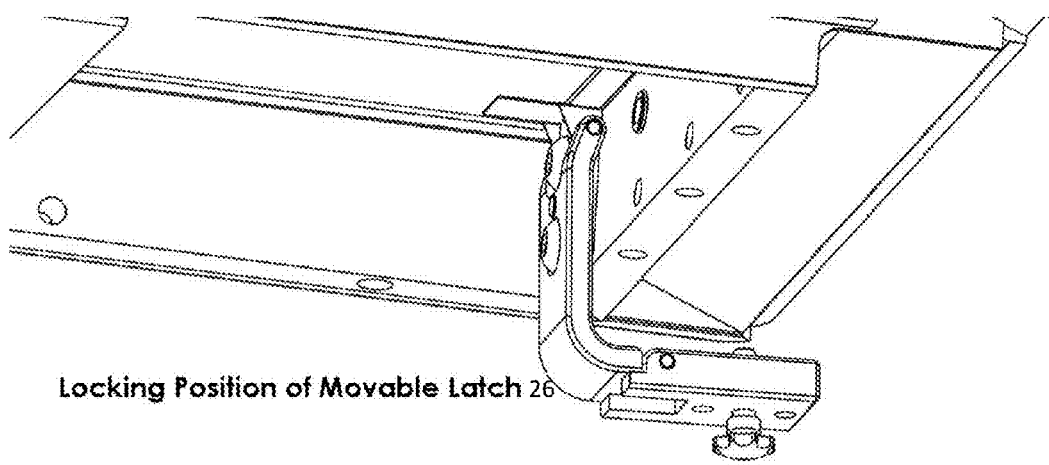
FIG. 11 is a perspective view of a moveable locking bracket of the first embodiment shown in a locking position on the underside of the tonneau cover.

FIG. 11 is a perspective view of the moveable magnetic locking bracket 26 shown in the locking position on the underside of the tonneau cover 10. This moveable magnetic locking bracket 26 may be securely bolted to the thick section of the edge structure. The moveable magnetic locking bracket 26 may be held in the locking position by a rare earth magnet 80 (shown in FIG. 12). The moveable magnetic locking bracket 26 may be conveniently moved to the open position as it pivots about the first hinge 86 near a bracket attachment point, and a second but weaker magnet 82 holds the latch open. A second hinge 90 allows the moveable magnetic locking bracket 26 to be completely folded so the tonneau cover 10 may be folded on itself without latches interfering with other sections of the tonneau cover 10. The adjustable bolt 88 is tightened to move upward and engage against the inside of the bed truck rail lip when a heavy load is secured to the top of the tonneau cover 10. This allows the loads on the surface 36 of the tonneau cover 10 to be reacted against the truck itself.

Figure 12:
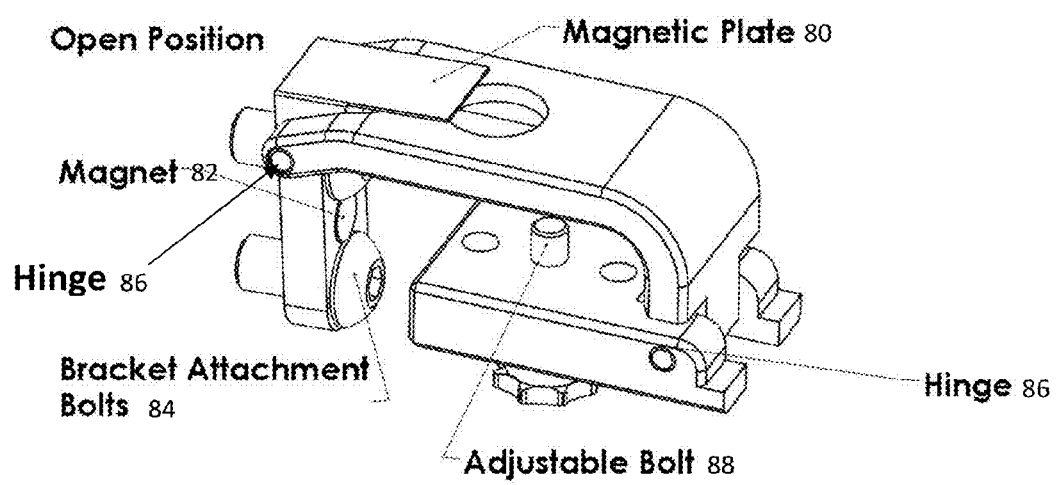
FIG. 12 is a perspective view of a moveable locking bracket of the first embodiment shown in an open position.
Figure 13:
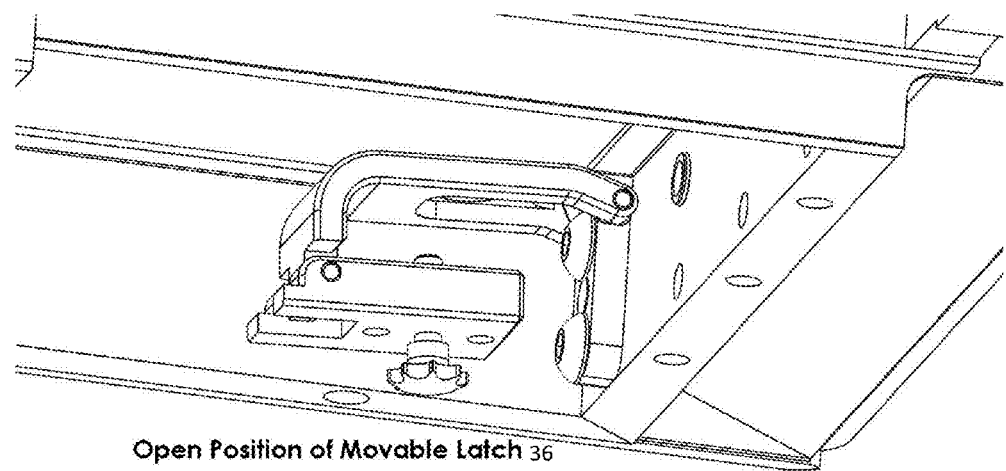
FIG. 13 is a perspective view of a moveable locking bracket of the first embodiment shown in an open position on the underside of the tonneau cover.

FIGS. 12 and 13 are perspective views that show the bracket in the open position.

The first embodiment of the present invention allows for loads to be secured on the surface 36 of the tonneau cover 10. Accordingly, there may be a need for a convenient method to store and access the necessary equipment used for securing loads. Tie down straps, tools, chains, etc. may tend to be loose in the bed of the truck or cluttering the cab because there may be no convenient method or means to access them.

Figure 14:
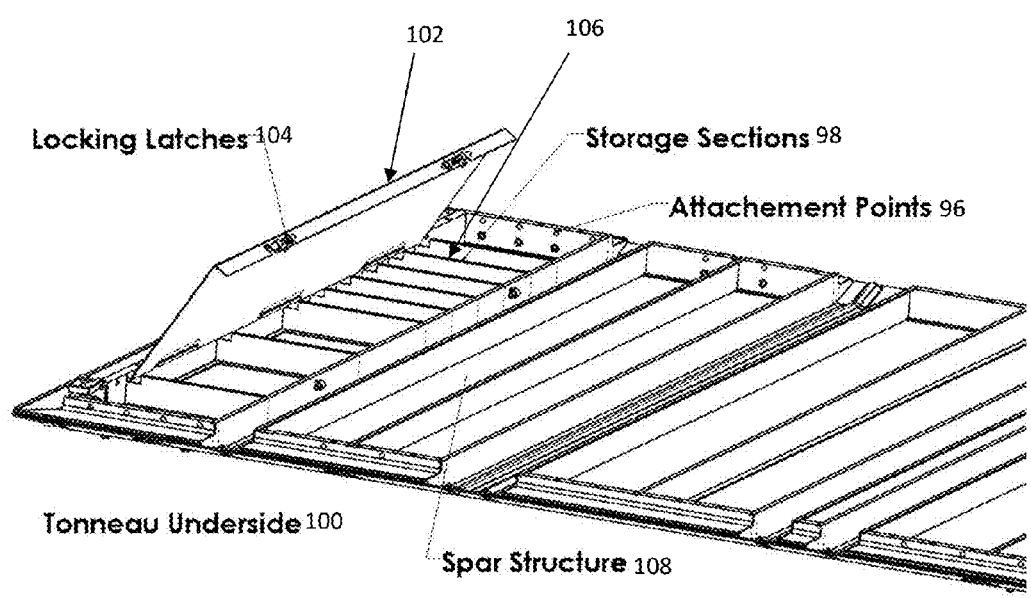
FIG. 14 is a perspective view of a tail gate section storage on underside of the tonneau cover of the first embodiment.
Figure 15:
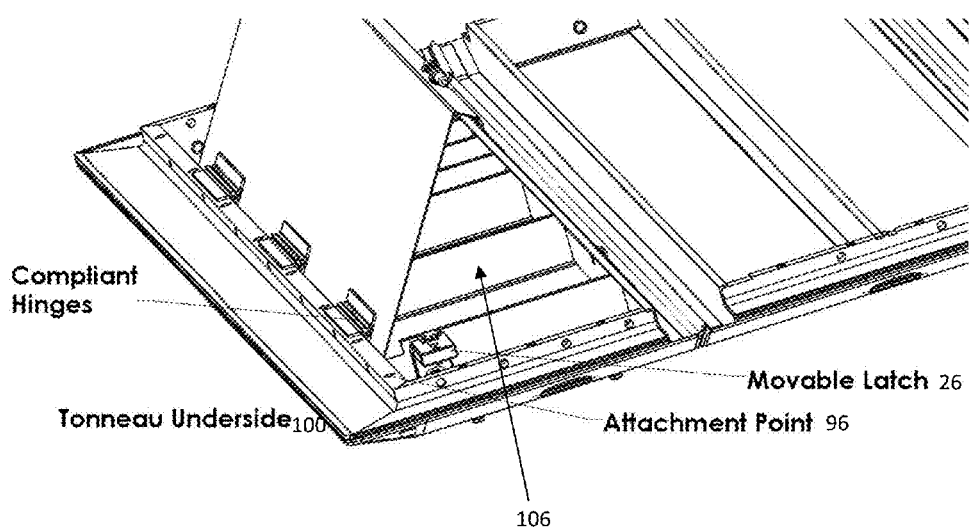
FIG. 15 is a perspective view of a tail gate section storage on underside of the tonneau cover showing the hinged lid configuration of the first embodiment.

FIGS. 14 and 15 may show a new method for storing equipment within a section of the tonneau cover 10. The hinge construction may be the same construction used to join the tonneau sections 12, 14, 16, 18 together in order to lower costs and maintain high strength standards used in the construction of the tonneau cover 10. Using the same construction methods may be important because the lid may carry the load of the items stored in the section of the tonneau cover 10 when the tonneau cover 10 is flat on the bed rails of the truck. Each section 12, 14, 16, 18 of the tonneau cover 10 may be used for storage.

FIG. 14 is a perspective view of the underside 100 of the tonneau cover 10. Each section 12, 14, 16, 18 may include a lid 102 that may be secured and opened using locking latches 104. The lid 102 may be opened when the section 14, 16, 18 is folded back to reveal a compartment 106 on the underside 100. Each compartment may have spar structures 108 that divide the compartments 106 into different storage sections 98. There may also be attachment points 96 on the walls of the compartments 106.

FIG. 15 shows additional detail of the compartments 106, including compliant hinges 94 and a moveable magnetic locking bracket 26.

Another aspect of the first embodiment for increasing the utility of this tonneau cover 10 may be the use of connection points to attach accessories such as tool boxes, winches, racks, specialty fixtures for sporting good items, etc. The problems associated with using fasteners to construct a tonneau cover 10 with existing art were identified earlier. These problems may be a result of joining thin sections of the tonneau cover 10 to other thin or thick sections. The first embodiment allows for the outer edge structure to have a thick section which allows for the mechanical attachment to other thick sections as shown in FIG. 16.

Figure 16:
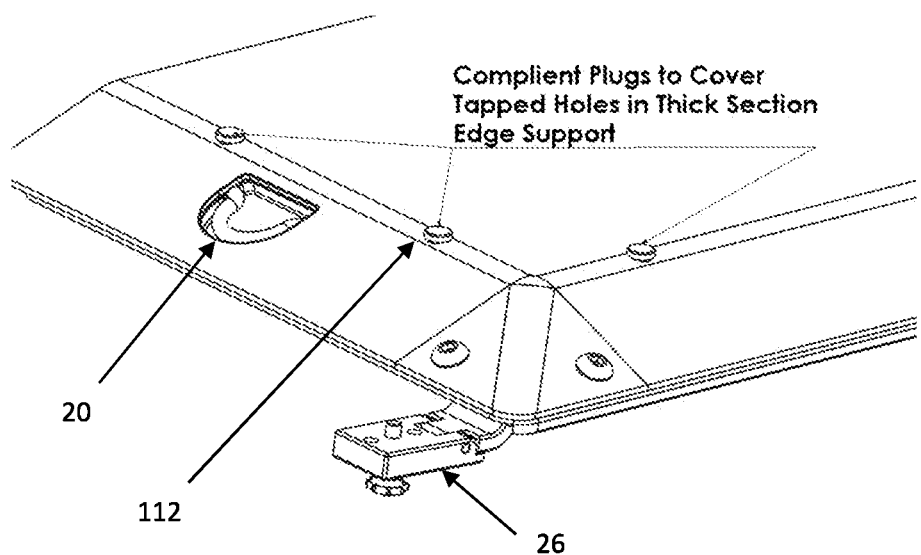
FIG. 16 is a perspective view of surface holes in the tonneau cover of the first embodiment that allow for external bolt attachment of external components.

In FIG. 16, surface holes in the tonneau cover 10 may allow for external bolt attachment of external components, with low profile compliant plugs 112 shown to maintain weatherproofing. For example, the rubber plugs 112 may be removed and an external component such as a ramp may be bolted to the surface 36 of the tonneau cover 10 so that a 4-wheeler or motorcycle may be driven or pulled to the top of the surface 36 of the tonneau cover and may be secured with tie downs to the D Rings.

In this example, the ramp may be unbolted and stored in the pickup bed. Another example would be to attach a "headache rack" to a hole pattern on the surface of the section 12 of the tonneau cover 10 that is adjacent to the cab of the truck in order to prevent surface cargo from contacting the rear window of the cab.

A plurality of different fixtures and accessories may be attached to the surface of the tonneau cover 10 for increased utility. In addition, there are several attachment points on the underside 100 of the tonneau cover 10 that may be used in the same fashion for attaching additional items.

Another aspect of the invention has been developed because of a problem that has been noticed with regards to keeping the tonneau cover 10 from moving during braking or acceleration of a vehicle. What is needed is a latch assembly that prevents unwanted movement of the tonneau cover 10.

Off-the-shelf latches are generally used in common applications and produced in large volumes so the latch component represents a small cost to the application. Specialty latches are more expensive and less common and are typically made to order. An example of a specialty latch is used to lock foldable hard tonneau covers in place on a pickup truck bed. It is common to use two opposing spring loaded pull pins that are connected together with a wire as they face opposite directions. As the wire is pulled transverse to the position of the pins, they retract towards each other and the pins release from their attachment point on the side of the truck bed. The pin is almost identical in design to the pins used to engage a door knob latch to the door jamb of the common house door. This style of latch is only used on foldable hard tonneau covers that do not carry loads.

Foldable load bearing Tonneau covers may be a means to carry heavy loads on a pickup truck while leaving space in the bed underneath the cover for storage. These tonneau covers may be unique in the sense that very heavy loads may be placed on top of the cover and attached or tied down using a D ring 20 system to secure the load to the surface 36 of the cover as disclosed above. The cover may be foldable or rather has independent load bearing panels or sections 14, 16, 18 that typically fold from the tail section towards the cab section of the truck to stack on top of each other and allow full access to the truck bed. Further, the embodiments above may teach that each of the panels or sections 14, 16, 18 is hinged with a compliant member such as rubber to allow folding and provide a water barrier. This tonneau cover 10 design is effective for attaching loads to the surface, freeing up space under the cover in the truck bed and weather proofing the bed.

Figure 17:
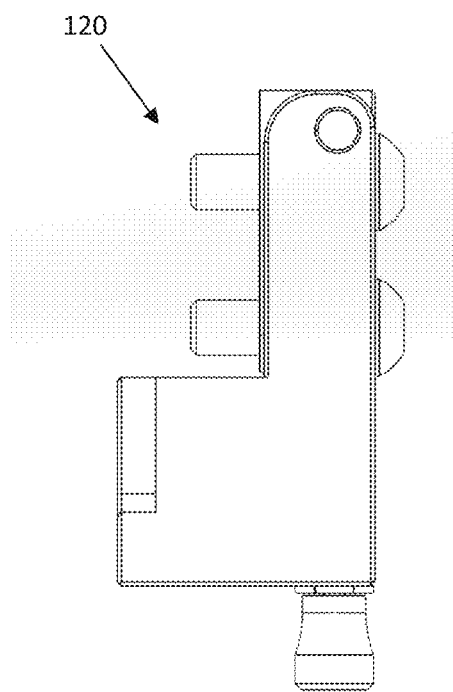
FIG. 17 shows the latch assembly in a closed position.
Figure 18:
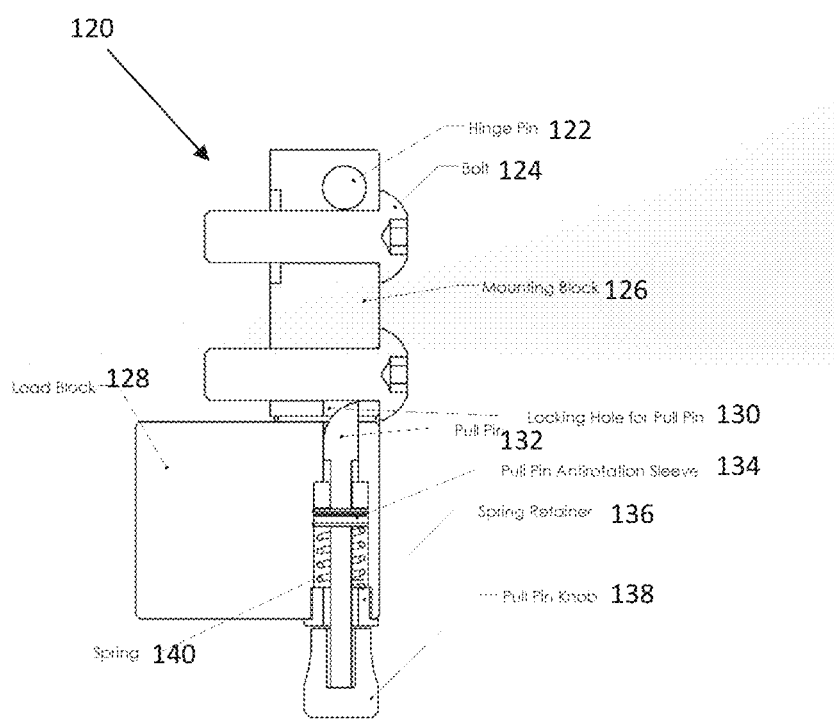
FIG. 18 shows the latch assembly in a cross-sectional view in a closed position.
Figure 19:
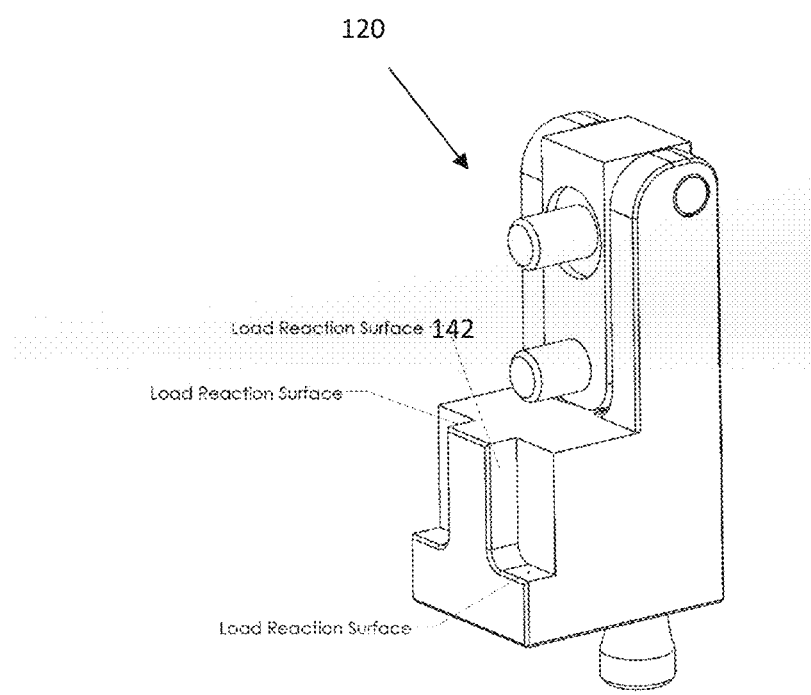
FIG. 19 shows the latch assembly in a closed position while showing load surfaces.

All of the embodiments of the invention may benefit from a novel approach to react multiple degrees of freedom in a single latch component. This shifts the need to design an assembly with a complex and expensive load bearing hinge system to react loads in multiple directions. FIGS. 17, 18 and 19 may show an entire latch assembly 120 in a closed position.

FIG. 17 shows the latch assembly 120 in a closed position.

FIG. 18 shows the latch assembly 120 in a cross-sectional view in a closed position, and illustrates a hinge pin 122, a bolt 124, a mounting block 126, a load block 128, a locking hole 130 for a pull pin, a pull pin 132, a pull pin anti-rotation sleeve 134, a spring retainer 136 a pull pin knob 138 and a spring 140.

FIG. 19 shows the latch assembly 120 in a closed position while showing load reaction surfaces 142.

Figure 20:
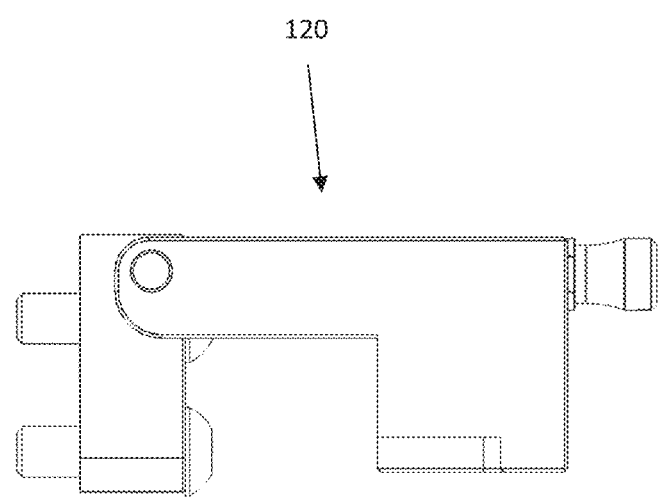
FIG. 20 shows the latch assembly in an open position.

FIG. 20 shows the latch assembly 120 in an open position.

Figure 21:
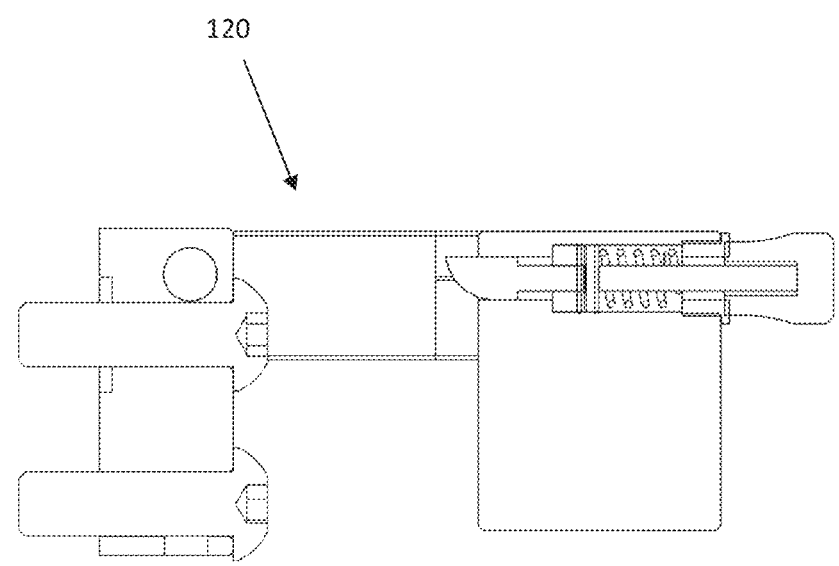
FIG. 21 shows a cross-sectional view of the latch assembly in the open position.

FIG. 21 shows a cross-sectional view of the latch assembly 120 in the open position.

Figure 22:
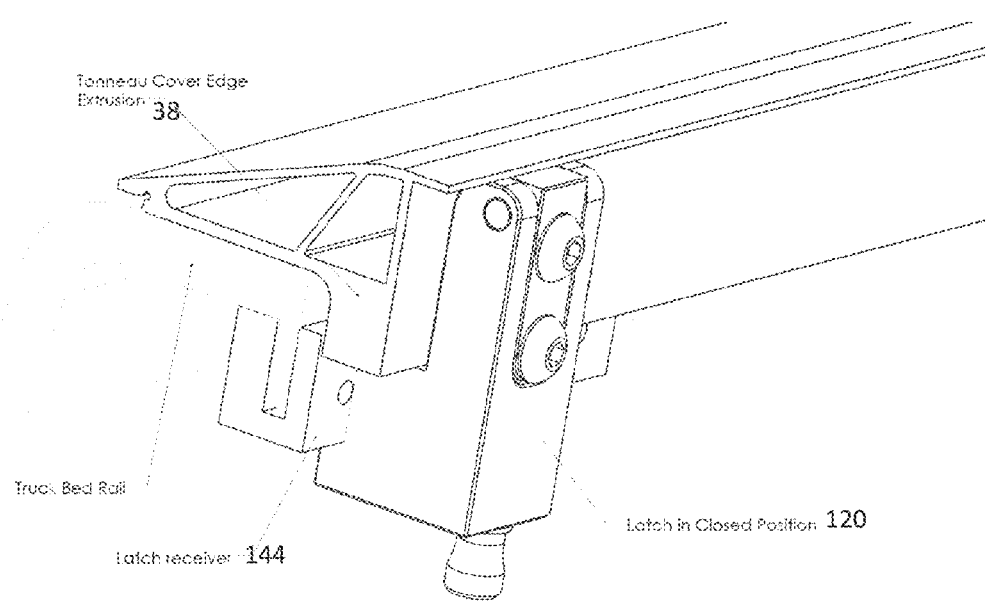
FIG. 22 shows the latch assembly attached to the tonneau cover and bed rail, with the latch assembly in the closed position.

FIG. 22 shows the latch assembly 120 with a latch receiver 144 attached to the structural edge extrusion 38 of the tonneau cover 10 and bed rail, with the latch assembly in the closed position. The latch assembly 120 shown screws into the vertical portion of the truck bed rail. No holes are required to drill into the truck.

Figure 23:
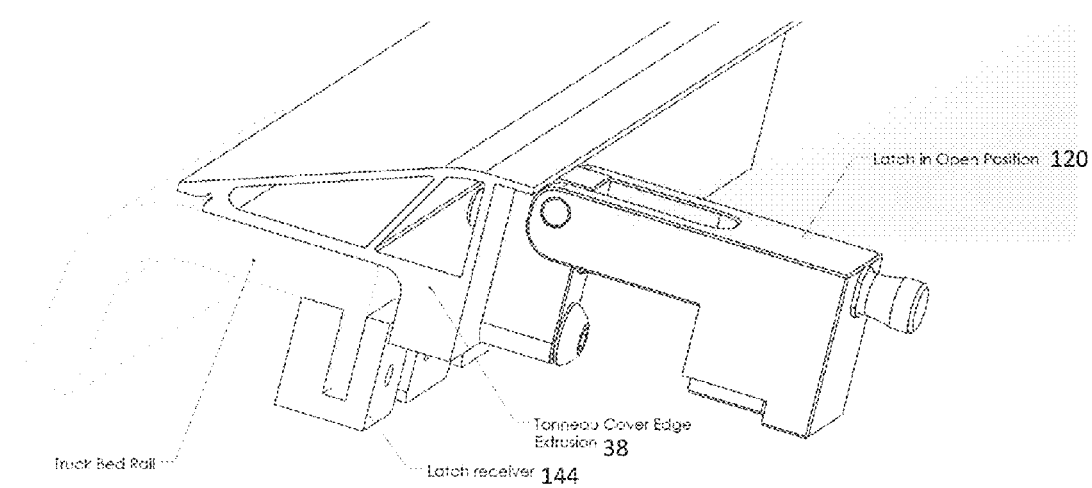
FIG. 23 shows the latch assembly on the bed rail in the open position.

FIG. 23 shows the latch assembly 120 with a latch receiver 144 attached to the structural edge extrusion 38 of the tonneau cover 10 and on the bed rail in the open position.

Figure 24:
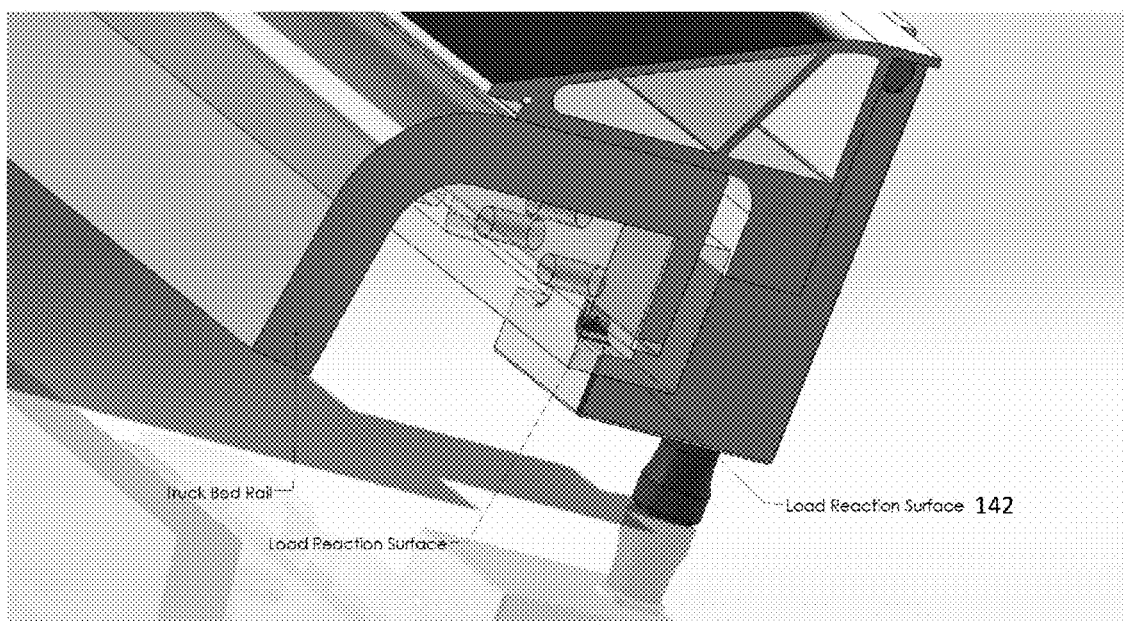
FIG. 24 shows the latch assembly loading surfaces.

FIG. 24 shows the latch assembly 120 load reaction surfaces 142.

Figure 25:
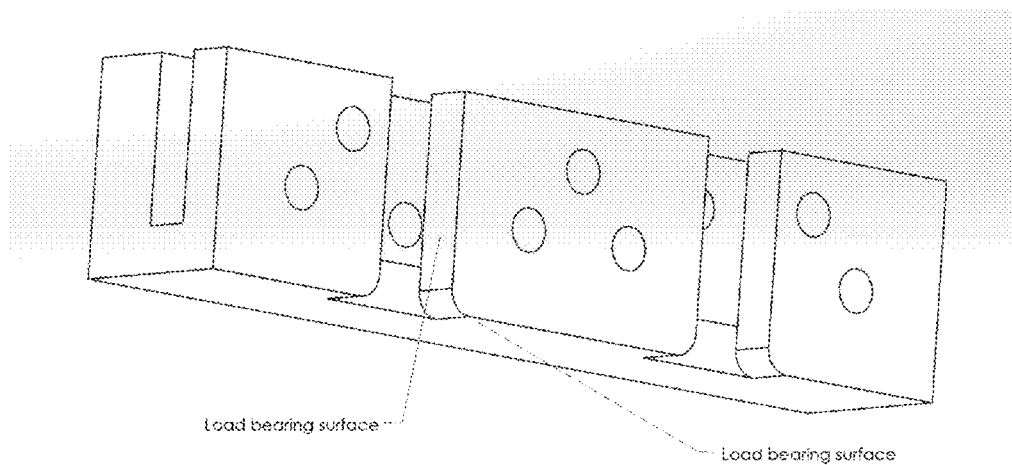
FIG. 25 shows the truck bed rail block that is attached to the bed rail using set screws.

FIG. 25 shows the truck bed rail block that is attached to the bed rail using set screws. The surfaces shown show the mating areas with the latch assembly 120 to react loads.

FIGS. 17-25 illustrate how the problems of a compliant hinge may be solved by having multiple surfaces of the latch assembly 120 reacted against the reacting surfaces of a truck bed rail block. The truck bed rail block is securely attached to the underside of the bed rail to react the loads from the tonneau cover 10 section to the truck bed rail. This is just one example of how high loads may be reacted through a latch assembly 120 and there are many applications with compliant hinges that would benefit from this invention.

Some advantages of the latch assembly 120 may include, but should not be considered as limited to, a hinged latch assembly that may restrict at least one degree of freedom in the closed position, a latch assembly with surfaces that may react loads without yielding latch material, a latch assembly having a release mechanism to open the latch, a latch assembly that may mate to a mounted block with surface to react loads, a mounting block that may not yield under load conditions, and a mounting block that may be attached using fasteners to eliminate drilling holes.

An alternative latch design is shown in FIGS. 26 to 30. This latch 150 may be a simpler design that prevents the tonneau cover 10 from moving up, down or along the bed of a truck.

Figure 26:
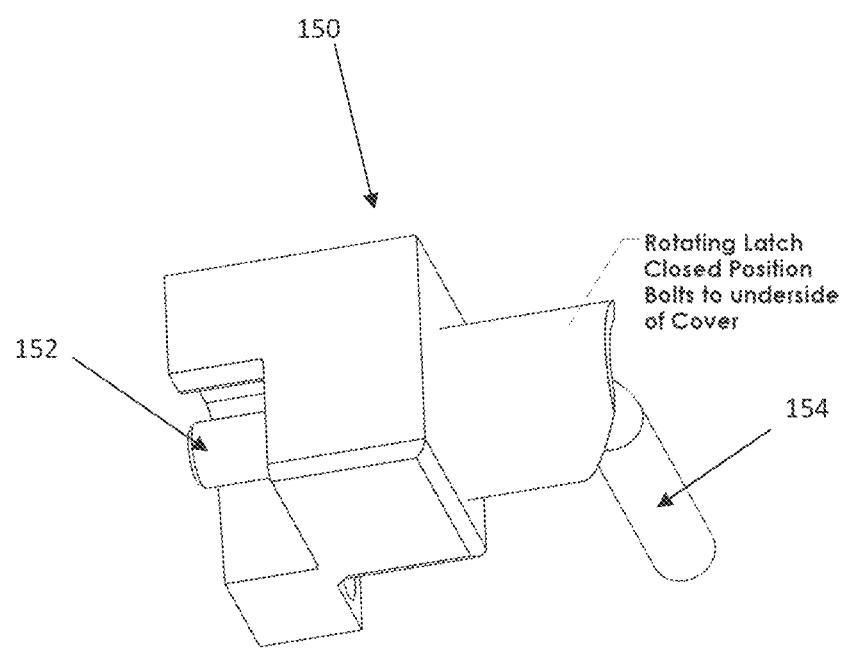
FIG. 26 is a perspective view of the latch mechanism that is bolted to the underside of the tonneau cover.

FIG. 26 is a perspective view of the latch 150 mechanism that is bolted to the underside 100 of the tonneau cover 10. The latch 150 includes a rod 152 that rotates into and out of a latch post (not shown), and a lever arm 154. The latch post is secured to the railing of the truck bed as will be shown. The rod 152 is shown in an extended and closed position, with the rod 152 extended all the way.

Figure 27:
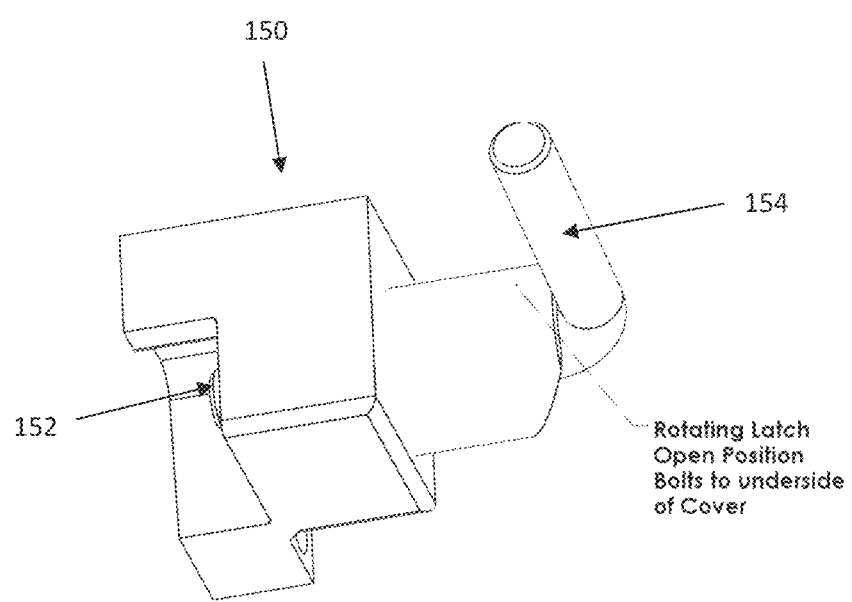
FIG. 27 is a perspective view that shows the latch where the lever arm has been rotated to thereby rotate the rod and retract the rod from the latch post.

FIG. 27 is a perspective view that shows the latch 150 where the lever arm 154 has been rotated to thereby rotate the rod 152 and retract the rod from the latch post.

Figure 28:
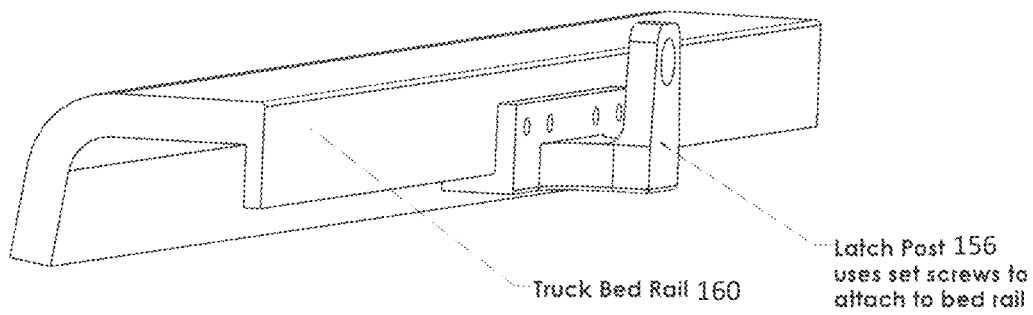
FIG. 28 is a perspective view of the latch post shown attached to the rail of the truck bed.

FIG. 28 is a perspective view of the latch post 156 shown attached to the rail 160 of the truck bed. The latch post 156 may be attached using set screws to prevent damage to the rail 160 and allow easy removal or adjustment of position along the rail. The hole 158 is also visible in the latch post 156 through which the rod 152 is inserted to lock the tonneau cover 10 to the rail 160.

Figure 29:
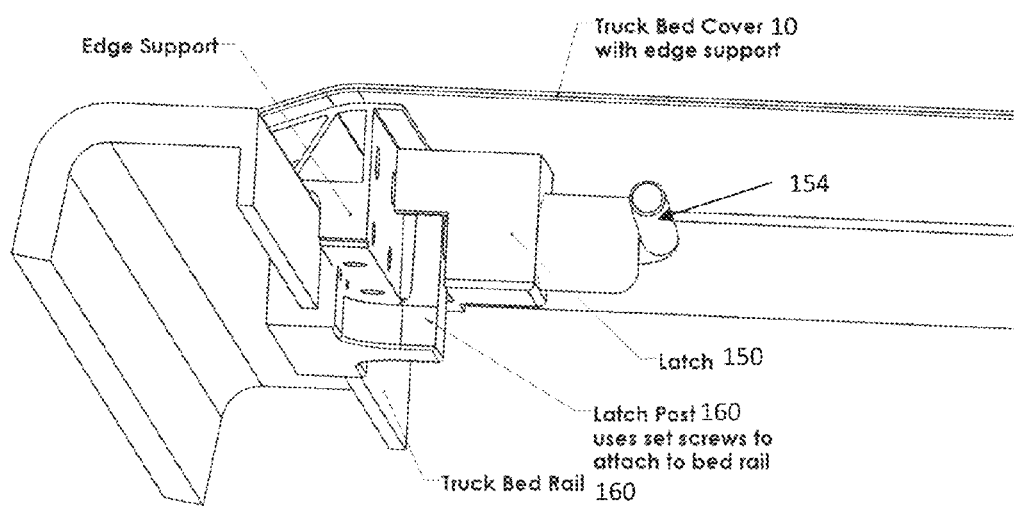
FIG. 29 is a perspective view that shows the latch, the lever arm, the latch post, the rail, and the underside of the tonneau cover to which the latch is attached.

FIG. 29 is a perspective view that shows the latch 150, the lever arm 154, the latch post 156, the rail 160, and the underside of the tonneau cover 10 to which the latch is attached.

Figure 30:
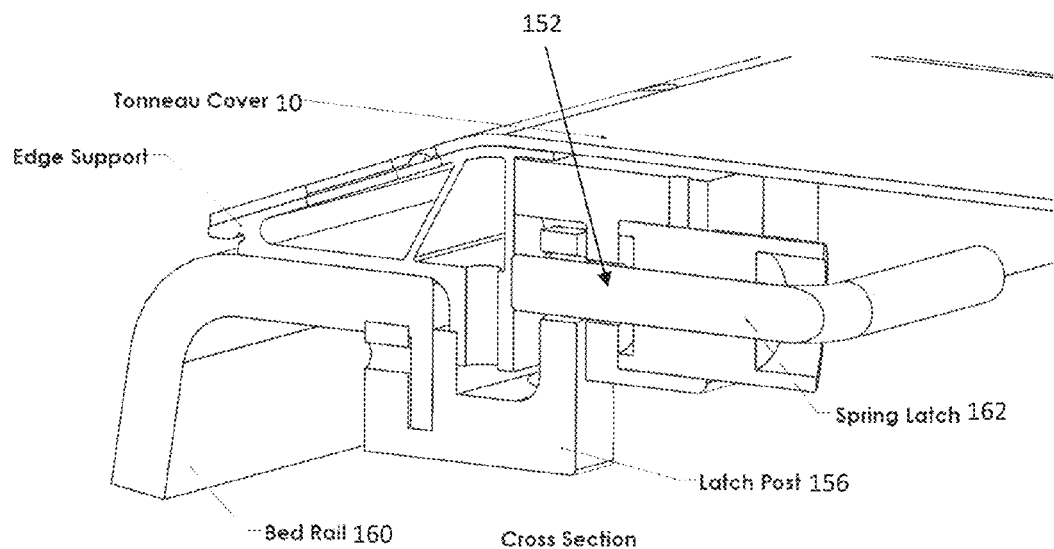
FIG. 30 is provided as a cross-sectional perspective view of the assembly shown in FIG. 29.

FIG. 30 is provided as a cross-sectional perspective view of the assembly shown in FIG. 29, also showing a spring 162 as part of the latch 150.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke 35 U.S.C. §112, paragraph 6 for any limitations of any of the claims herein, except for those in which the claim expressly uses the words 'means for' together with an associated function.

What is claimed is:

1. A tonneau cover, said tonneau cover comprised of:
   a plurality of tonneau sections, wherein each of the tonneau sections is constructed using friction stir welds, each of the tonneau sections including a hinge knuckle at each edge where it is joined to an adjacent tonneau section, each of the hinge knuckles being joined to respective tonneau sections using friction stir welding, and having a semi-circular element in the hinge knuckle;
   a rubber hinge connection between each of the adjacent tonneau sections, wherein each of the rubber hinge connections is is disposed within the semi-circular element of two hinge knuckles; and
   a rod that is inserted into circular elements of the rubber hinge connection so as to expand the rubber hinge connection and hold it securely within each semi-circular element in order to secure the rubber hinge connection between each of the adjacent tonneau sections.

2. The system as defined in claim 1 wherein the rubber hinge includes a feature to prevent the hinge from being separated from the plurality of tonneau sections.

3. The system as defined in claim 1 wherein the tonneau cover is further comprised of a plurality of D rings for providing points of attachment to a working surface of the tonneau cover, wherein the plurality of D rings are recessed beneath the working surface of the tonneau cover.

4. The system as defined in claim 3 wherein the D ring is restrained by a flanged ring on an underside of the surface of the tonneau cover to thereby resist load.

5. The system as defined in claim 1 wherein the tonneau cover is coupled to bed rails using a plurality of J clamps that eliminate a need for damaging the bed rails.

6. The system as defined in claim 1 wherein the tonneau cover is further comprised of a spring loaded latch mechanism for releasing a first section of the plurality of tonneau sections from a tailgate so that the first section may be lifted and folded back onto a second section of the plurality of tonneau sections.

7. The system as defined in claim 1 wherein the tonneau cover is further comprised of a storage compartment disposed on a bottom side of any section of the plurality of tonneau sections.

8. The system as defined in claim 1 wherein the tonneau cover is further comprised of a plurality of attachment points disposed into the surface of the tonneau cover.

9. The system as defined in claim 8 wherein the attachment points are threaded to enable a threaded screw to be coupled to the plurality of attachment points.

10. The system as defined in claim 1 wherein the tonneau cover is further comprised of a moveable latch that couples the tonneau cover to any portion of a truck rail.

11. The system as defined in claim 1 wherein the moveable latch is comprised of a magnetic system for magnetically holding the moveable latch in an open or a closed position.

12. A method for manufacturing a tonneau cover, said method comprised of:
   providing a plurality of tonneau sections, wherein each of the tonneau sections is constructed using friction stir welds, each of the tonneau sections including a hinge knuckle at each edge where it is joined to an adjacent tonneau section, each of the hinge knuckles being joined to respective tonneau sections using friction stir welding, and having a semi-circular element in the hinge knuckle;
   providing a rubber hinge connection between each of the adjacent tonneau sections, wherein each of the rubber hinge connections is disposed within the semi-circular element of two hinge knuckles; and
   inserting a rod into circular elements of the rubber hinge connection so as to expand the rubber hinge connection and hold it securely within each semi-circular element in order to secure the rubber hinge connection between each of the adjacent tonneau sections.

\* \* \* \* \*